US012652181B2

(12) United States Patent
Fujita et al.

(10) Patent No.: US 12,652,181 B2
(45) Date of Patent: Jun. 9, 2026

(54) MANAGEMENT SYSTEM, CONTENT MANAGEMENT METHOD, AND STORAGE MEDIUM FOR MANAGING CONTENT DATA USING BLOCKCHAIN

(71) Applicant: CANON KABUSHIKI KAISHA, Tokyo (JP)

(72) Inventors: Atsushi Fujita, Tokyo (JP); Keiichiro Kubo, Saitama (JP); Daiyu Ueno, Tokyo (JP); Naohiko Tsuchida, Tokyo (JP); Keisuke Tanaka, Kanagawa (JP); Minoru Sakaida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 18/409,706

(22) Filed: Jan. 10, 2024

(65) Prior Publication Data

US 2024/0243933 A1 Jul. 18, 2024

(30) Foreign Application Priority Data

Jan. 16, 2023 (JP) ................................. 2023-004478

(51) Int. Cl.
*H04L 9/00* (2022.01)
(52) U.S. Cl.
CPC ..................................... *H04L 9/50* (2022.05)
(58) Field of Classification Search
CPC ......... H04L 9/3239; H04L 9/50; H04L 9/321; H04L 2209/608; G06F 21/16; G06Q 20/1235; G06Q 2220/16; H04N 21/2743
See application file for complete search history.

(56) References Cited

U.S. PATENT DOCUMENTS

| | | | |
|---|---|---|---|
| 2020/0012765 A1* | 1/2020 | Smaiely | H04L 9/3297 |
| 2021/0233204 A1* | 7/2021 | Alattar | G06T 1/0028 |
| 2023/0121095 A1 | 4/2023 | Ueno et al. | G06F 21/62 |

FOREIGN PATENT DOCUMENTS

JP 2017-204706 11/2017

OTHER PUBLICATIONS

U.S. Appl. No. 18/585,912, filed Feb. 23, 2024.

* cited by examiner

*Primary Examiner* — Olugbenga O Idowu
(74) *Attorney, Agent, or Firm* — Venable LLP

(57) ABSTRACT

A management system that manages content data corresponding to a hash value registered in a block of a blockchain. Content data selected by a user from among pieces of content data that are management targets, is provided to a provision destination of the selected content data. Information on the provision destination of the selected content data is registered in a block of the blockchain in association with an identification number for identifying the selected content data. When the management system receives content data that is a target of authenticity determination, an identification number for identifying the content data, and user information of the content data, authenticity of the received content data is determined. In the determination of the authenticity of the received content data, the received user information is compared with the provision destination information registered in the blockchain.

15 Claims, 11 Drawing Sheets

FIG. 5

| BLOCK ID | AUTHENTICITY GUARANTEE NUMBER | IMAGE FILE NAME |
|----------|------------------------------|-----------------|
| 0 | 0000000000000000 | IMG_0000.JPG |
| 1 | 5432456667777773 | IMG_0001.JPG |
| 2 | 0988501939374728 | IMG_0002.JPG |
| 3 | 1111220034355050 | IMG_0003.JPG |
| 4 | 3322434456777888 | IMG_0004.JPG |

| USER | POSTING DATE | WHERE DATA IS USED | |
|---|---|---|---|
| NEWS PAPER A | 2022/01/01 | https://ajdafuejiafejiaafidafe/daily/ | ~1101 |
| NEWS AGENCY B | 2022/02/06 | https://eicuegiue8e9pj0ada/news/ | ~1102 |

MANAGEMENT SYSTEM, CONTENT MANAGEMENT METHOD, AND STORAGE MEDIUM FOR MANAGING CONTENT DATA USING BLOCKCHAIN

BACKGROUND OF THE INVENTION

Field of the Invention

The present disclosure relates to management systems, content management methods, and storage media.

Description of the Related Art

In recent years, information sharing via the Internet or a social networking service (SNS) has become active, which allows anyone to view and transmit information. Under such circumstances, evolution of digital image processing technology makes it difficult for information viewers to confirm the authenticity of what they are viewing, and problems such as fake news have become serious. To address these problems, there is a growing demand for a mechanism capable of guaranteeing the authenticity of digital images, that is, guaranteeing that, for example, no processing or no falsification is added to the digital images.

As a mechanism capable of guaranteeing the authenticity of digital images, it is considered to use blockchain technology which is widely used in finance and other industries. Blockchain technology can prevent falsification of digital data in a decentralized manner and at low cost.

For example, a management system using blockchain technology registers, in a blockchain, a hash value of content data generated by a content generation apparatus and metadata accompanying the content data as content information. Thereby, the authenticity of the content data from the time of its generation is guaranteed (for example, refer to Japanese Laid-Open Patent Publication (kokai) No. 2017-204706). This technology makes it possible to acquire, from the management system, content data that has not been processed or otherwise tampered with since its generation, and to publish the acquired content on the Internet, the SNS, or the like.

However, with the above technique disclosed in Japanese Laid-Open Patent Publication (kokai) No. 2017-204706, it is possible to determine whether content data has not been falsified from the time of generation of the content, but it is difficult to determine whether content data has been copied and used without permission. Thus, for example, in the field of news photography, it is possible to verify whether a photograph used in an article has not been falsified with since it was taken, i.e., whether the photograph does not contain false information, but it is difficult to verify whether the photograph has been copied and used without permission by a someone other than a person who took the photograph.

SUMMARY OF THE INVENTION

The disclosure is directed to management systems, content management methods, and storage media, capable of determining whether content data is copied and used without permission.

According to an aspect of the disclosure, a management system that manages content data corresponding to a hash value registered in a block of a blockchain is provided. The management system includes a memory storing instructions; and at least one processor. The at least one processor executes the instructions to provide content data selected by a user from among a plurality of pieces of content data that are management targets, to a provision destination of the selected content data; and register information on the provision destination of the selected content data in a block of the blockchain in association with an identification number for identifying the selected content data. The at least one processor executes the instructions to receive content data that is a target of authenticity determination, an identification number for identifying the content data that is the target of authenticity determination, and user information of the content data that is the target of the authenticity determination. The at least one processor executes the instructions to determine authenticity of the received content data, and in the determination of the authenticity of the received content data, make a comparison between the received user information and the information on the provision destination registered in the blockchain and associated with the received identification number.

According to another aspect of the disclosure, a content management method for managing content data corresponding to a hash value registered in a block of a blockchain, is provided. The content management method includes providing content data selected by a user from among a plurality of pieces of content data that are management targets, to a provision destination of the selected content data; and registering information on provision destination of the selected content data in a block of the blockchain in association with an identification number for identifying the selected content data. The content management method further includes receiving content data that is a target of authenticity determination, an identification number for identifying the content data that is the target of the authenticity determination, and user information of the content data that is the target of the authenticity determination; and determining authenticity of the received content data. The content management method further includes, in the determining, comparing the received user information with the information on the provision destination registered in the blockchain and associated with the received identification number.

According to the disclosure, it is possible to determine whether content data is copied and used without permission.

Further features of the present invention will become apparent from the following description of exemplary embodiments with reference to the attached drawings.

BRIEF DESCRIPTION OF THE DRAWINGS

FIG. 5 is a diagram illustrating an example of a configuration of an image database in FIG. 4.

FIG. 11 is a diagram illustrating an example of provision destination information registered in a block of a blockchain in the present embodiment.

DESCRIPTION OF THE EMBODIMENTS

The present invention will now be described in detail below with reference to the accompanying drawings showing embodiments thereof.

Figure 1:
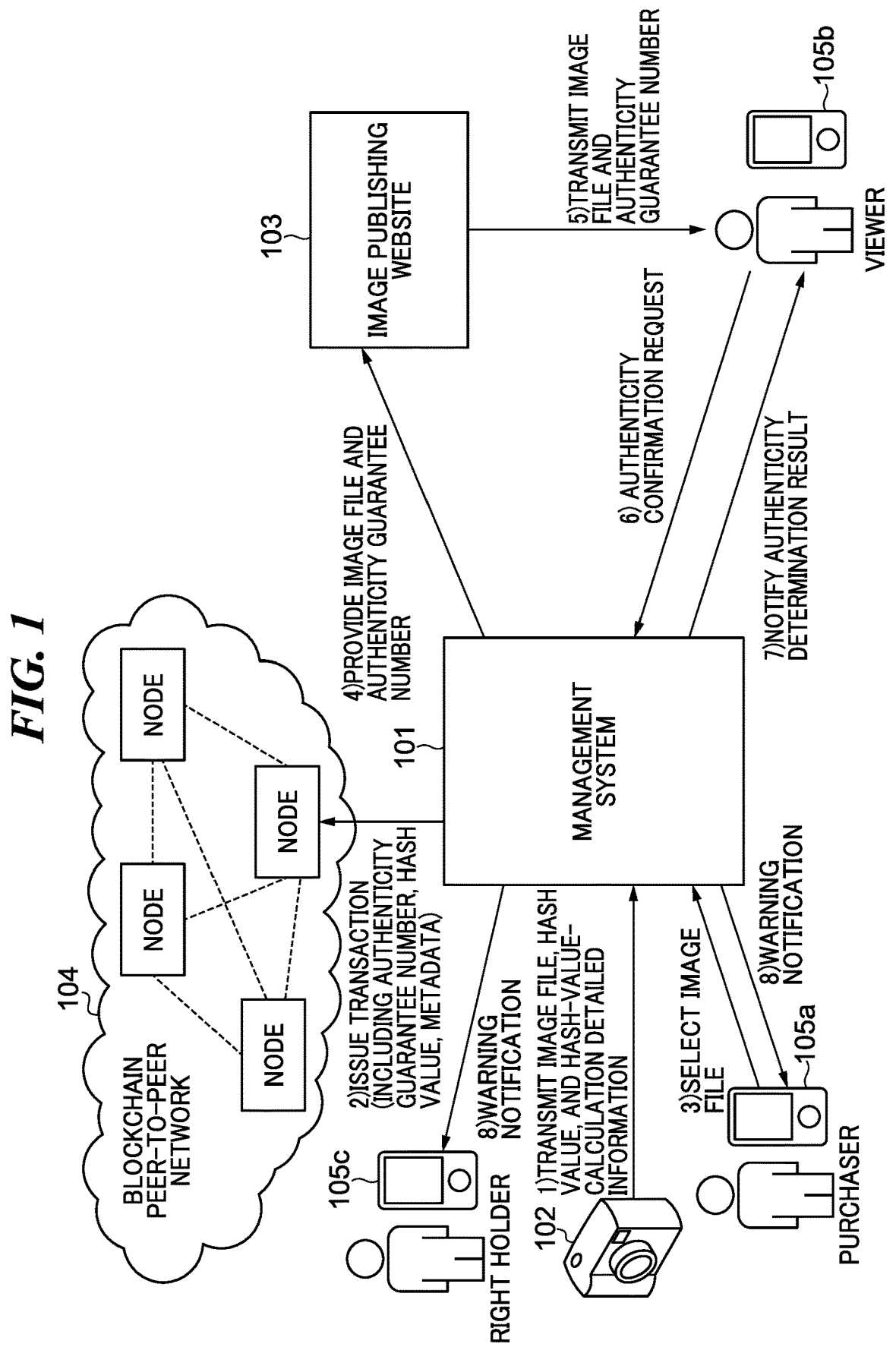
FIG. 1 is a diagram illustrating functions of a management system according to the present embodiment.

FIG. 1 is a diagram illustrating functions of a management system 101 according to the present embodiment.

The management system 101 has a function of managing content data acquired from an external device, such as an image pickup apparatus 102, via the Internet or the like. The management system 101 is implemented by one or more computing devices. In the present embodiment, the management system 101 is configured to communicate with a blockchain peer-to-peer network 104 to manage content data corresponding to a hash value registered in a block of a blockchain. However, it is not limited to this configuration, and the management of content data may be realized using another network.

As illustrated in FIG. 1, upon performing a capturing operation (capturing an image of a subject), the image pickup apparatus 102 transmits an image file obtained by the capturing operation, a hash value (image hash value) of the image file, and hash-value-calculation detailed information to the management system 101 in association with each other (step (1)). The image file, which is an example of content data in the present embodiment, includes image data and metadata. The image data is still image data or video data. The metadata includes attribute information of the image data, indicating a person who captured the image data (photographer or videographer), time of image capturing, location of image capturing, model of the image pickup apparatus, setting values at the time of image capturing, and the like. The metadata may further include information on a right holder of the image file (right holder information), indicating a person who has acquired the right to own the image file from the photographer or videographer. In the present embodiment, right holders of an image file or content data include a person who captured image data and a person who has acquired the right to own the image file from the person who captured the image data. The hash value is a value obtained by executing a hash function on the image file at the time of generation.

The hash-value-calculation detailed information is information, in a case where image data included in the image file is thinned out and then a hash function is executed on the image data, describing information indicating the way to thin out the image data. It should be noted that as to an algorithm of the hash function, only a default algorithm may be used, or one of multiple algorithms, such as SHA 256 and MD5, may be selected. In the latter case (a case where one of multiple algorithms is selected), the algorithm used for the hash value calculation is also described in the hash-value-calculation detailed information. For example, in a case where the image data is hashed by the algorithm SHA 256, SHA 256 processes the data 64-bytes to 64-bytes from the head to the end of the data, thereby generating a hash value of 32 bytes (256 bits). If a process in which first 64 bytes from the head of the image data are used for the processing and the next 64 bytes are skipped without being used for the processing, is repeatedly performed for the whole image data, a processing amount will be halved. The hash-value-calculation detailed information in this case can be expressed as, for example, "Algorithm, SHA 256, Read, 64, Skip, 64" in the CSV file format. In another case where the image data is video data, the hash function can be executed every other frame. The hash-value-calculation detailed information in this case can be expressed as, for example, "Algorithm, SHA 256, SkipFrame, 1," in the CSV file format. Further, in combination with this, it is also possible to thin out data within one frame instead of using all the data. The hash-value-calculation detailed information in this case can be expressed as, for example, "Algorithm, SHA 256, SkipFrame, 1, Read, 64, Skip, 64" in the CSV file format.

It should be noted that the format of the hash-value-calculation detailed information is not limited to the CSV file format. For example, a widely used file format, such as the JSON file format, may be used, or a unique file format may be used.

It should be noted that, in the present embodiment, the image pickup apparatus 102 is configured to generate a hash value and transmit the hash value to the management system 101, but it is not limited to this configuration. For example, the management system 101 may be configured to generate a hash value based on an image file acquired from the image pickup apparatus 102.

Upon receiving the image file, the hash value, and the hash-value-calculation detailed information from the image pickup apparatus 102, the management system 101 of the present embodiment generates an authenticity guarantee number that is a unique number in the management system 101. The authenticity guarantee number is an identification number for uniquely identifying the image file.

The management system 101 generates transaction data including the metadata, the hash value, the hash-value-calculation detailed information, and the authenticity guarantee number, and connects a block in which the generated transaction data is written to a blockchain. Specifically, the management system 101 issues the generated transaction data and broadcasts the transaction data to one or more computers (nodes) participating in the blockchain peer-to-peer network 104 (step (2)). As a result, the transaction data is temporarily stored in a transaction pool, and its verification is completed when the transaction data is approved by a miner. Then, a block in which the transaction data is written is generated and the block is added to the tail of the blockchain. As a result, the metadata, the hash value, the hash-value-calculation detailed information, and the authenticity guarantee number are registered in the blockchain in association with each other.

After connecting the block in which the transaction data is written to the blockchain, the management system 101 stores the image file and the authenticity guarantee number in association with each other in an image database 407 in FIG. 4 which will be described later.

Thereafter, the management system 101 allows a user (for example, a right holder or a purchaser) to select an image file to be published on the image publishing website 103 from among a plurality of image files registered in the image database 407 (step (3)). Specifically, the user is allowed to access a web page of the management system 101 from a communication device 105a operated by the user, and select, on the web page, an image file to be published on the image publishing website 103. The management system 101 provides the image file selected by the user and the authenticity guarantee number associated with the image file to the image publishing website 103 (step (4)). At the same time, the management system 101 notifies the communication device 105a that the image file selected by the user in step (3) is now ready for publication on the image publishing website 103. Further, the management system 101 generates transaction data including information on provision destination or recipient of the image file selected by the user (provision destination information) and the authenticity guarantee number of the image file. The provision destination information includes, for example, information indicating a user who has selected the image file, and address information of a web page, an SNS, or the like on which an article created on the basis of the image file is posted. The management system 101 connects a block in which the generated transaction data is written to the blockchain. As a result, the provision destination information of the image file selected by the user is registered in the block of the blockchain in association with the authenticity guarantee number of the image file.

On the web page of the image publishing website 103, for example, an article created on the basis of the image file provided from the management system 101 is posted. The image publishing website 103 performs display control such that the authenticity guarantee number provided together with the image file from the management system 101 is displayed, for example, in the vicinity of the image data based on the image file on the web page. It should be noted that the display position of the authenticity guarantee number is an example, and the authenticity guarantee number may be displayed at any position where a viewer of the image publishing website 103 can recognize that the authenticity guarantee number corresponds to the image file.

There are cases where a viewer of the image publishing website 103 desires to check or confirm whether or not image data displayed on the web page of the image publishing website 103 has been falsified from the time of capturing (authenticity confirmation). In such a case, the viewer first acquires (downloads) an image file corresponding to the image data and the authenticity guarantee number associated with the image file from the image publishing website 103 using a communication device 105b (step (5)). Specifically, the viewer accesses the web page of the image publishing website 103 from the communication device 105b, selects the image file published on the web page, and gives an instruction to download the image file. When this instruction is given, the image publishing website 103 transmits the selected image file and the authenticity guarantee number to the communication device 105b.

When the download is completed, the communication device 105b transmits an authenticity confirmation request for the image file to the management system 101 together with the acquired image file, the authenticity guarantee number, and the address information of the posting destination of the article created on the basis of the image file (user information of the image file) (step (6)). The address information is an example of user information of the image file. In the present embodiment, the authenticity confirmation request is made by a viewer using the communication device 105b to make an attachment of the image file, the authenticity guarantee number, and the address information acquired from the image publishing website 103 to an input form provided by the management system 101. However, the authenticity confirmation request is not limited to the method of the present embodiment, and may be made, for example, by transmitting an e-mail, to which the image file, the authenticity guarantee number, and the address information are attached, to the management system 101.

When the authenticity confirmation request is transmitted from the communication device 105b, the management system 101 determines the authenticity of the image file that is a target of the authenticity confirmation request. Here, the authenticity is determined at the time when the management system 101 receives the authenticity confirmation request for the image data displayed on the image publishing website 103, from the communication device 105b of the viewer of the image publishing website 103, but the time to determine the authenticity is not limited thereto. For example, the management system 101 may periodically determine the authenticity on the basis of the image database 407. The management system 101 displays the authenticity determination result on the web page of the management system 101 or notifies the communication device 105b of the authenticity determination result by e-mail (step (7)).

The management system 101 determines whether or not a user of the image file that is a target of the authenticity confirmation request is a person who is permitted to use the image file, such as a right holder or a purchaser of the image file. In this determination, the management system 101 compares user information received from the communication device 105b with provision destination information registered in the blockchain and associated with an identification number received from the communication device 105b. In a case where the user of the image file that is a target of the authenticity confirmation request is not a person who is permitted to use this image file, the management system 101 sends a warning notification to a right holder and/or a purchaser of the image file that is a target of the authenticity confirmation request, for example, the communication device 105a of the purchaser of the image file that is a target of the authenticity confirmation request or a communication device 105c of the right holder of the image file (step (8)). Details of the processing related to the warning notification will be described later.

Figure 2:
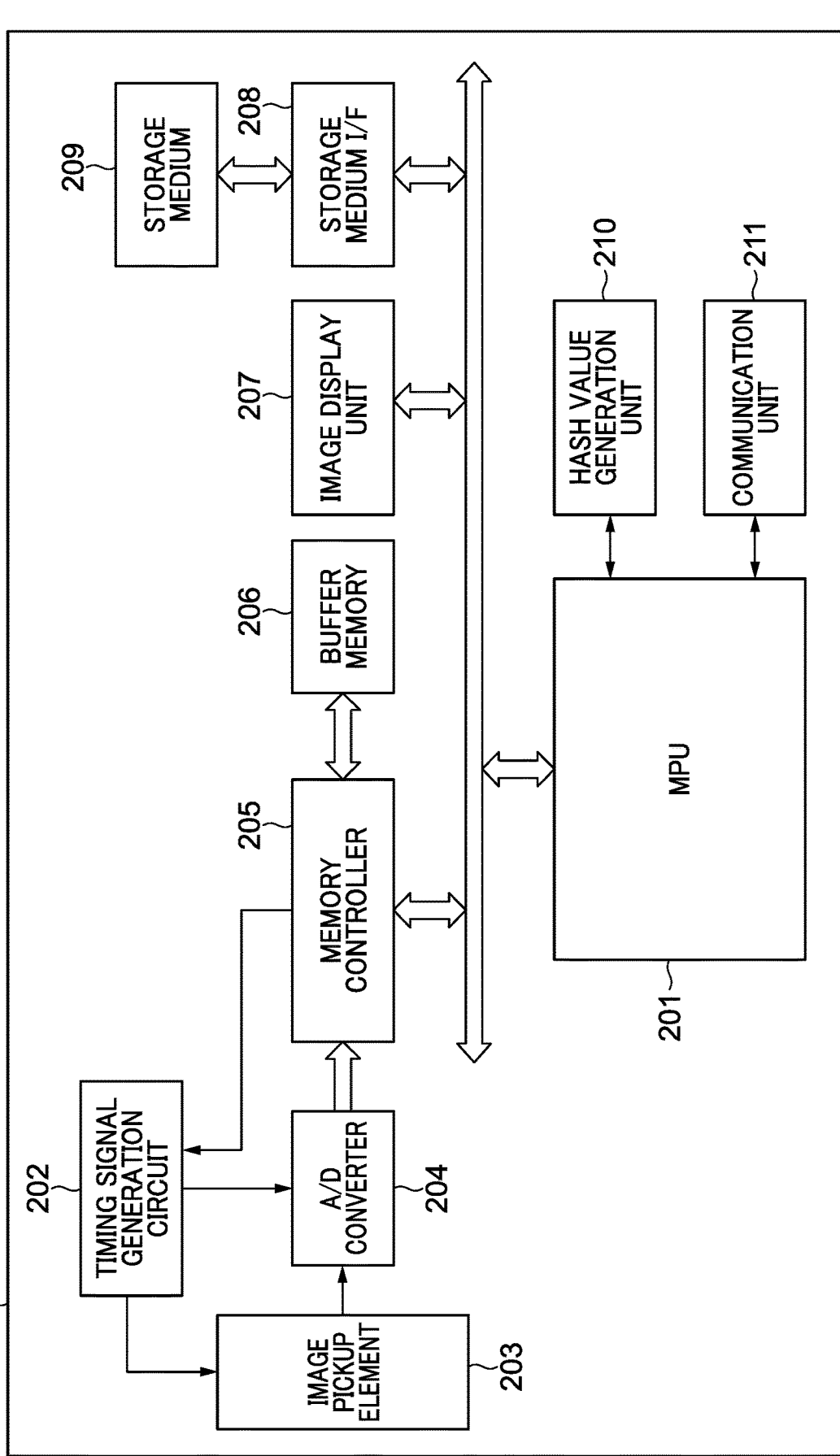
FIG. 2 is a block diagram schematically illustrating a configuration of an image pickup apparatus in FIG. 1.

FIG. 2 is a block diagram schematically illustrating a configuration of the image pickup apparatus 102 in FIG. 1. The image pickup apparatus 102 may be a camera such as a digital camera or a digital video camera, or may be an electronic device having a camera function, such as a mobile phone having a camera function or a camera-equipped computer.

In FIG. 2, the image pickup apparatus 102 includes an MPU 201, a timing signal generation circuit 202, an image pickup element 203, an A/D converter 204, a memory controller 205, a buffer memory 206, and an image display unit 207. Furthermore, the image pickup apparatus 102 includes a storage medium I/F 208, a storage medium 209, a hash value generation unit 210, and a communication unit 211.

The MPU 201 is a microcontroller for performing control related to a system of the image pickup apparatus 102 such as an image capturing sequence.

The timing signal generation circuit 202 is configured to generate a timing signal necessary for operating the image pickup element 203.

The image pickup element 203 is an image sensor such as a CCD or a CMOS that is configured to receive light reflected by a subject, convert the received light into an electrical signal (analog image data), and allow the A/D converter 204 to read out the electrical signal.

The A/D converter 204 is configured to convert analog image data read from the image pickup element 203 into digital image data. Hereinafter, this digital image data is simply referred to as "image data".

The memory controller 205 is configured to control reading and writing of an image file from and to the buffer memory 206, a refresh operation on the buffer memory 206, and the like. This image file is an image file generated by the MPU 201 as will be described later, in which metadata thereof is added to image data. Details thereof will be described later.

The buffer memory 206 is configured to store image files.

The image display unit 207 is configured to display an image file stored in the buffer memory 206.

The storage medium I/F 208 is an interface for controlling reading and writing of data from and to the storage medium 209.

The storage medium 209 is a storage medium like a memory card or a hard disk, and is configured to store programs, image files, and the like.

The hash value generation unit 210 is configured to generate (calculate) a hash value by executing a hash function on an image file stored in the buffer memory 206. It should be noted that the MPU 201 instead of the hash value generation unit 210 may be configured to generate a hash value. The hash value may be generated by executing a hash function on image data instead of an image file.

The communication unit 211 is connected to the Internet so as to transmit and receive data to and from an external device.

Figure 3:
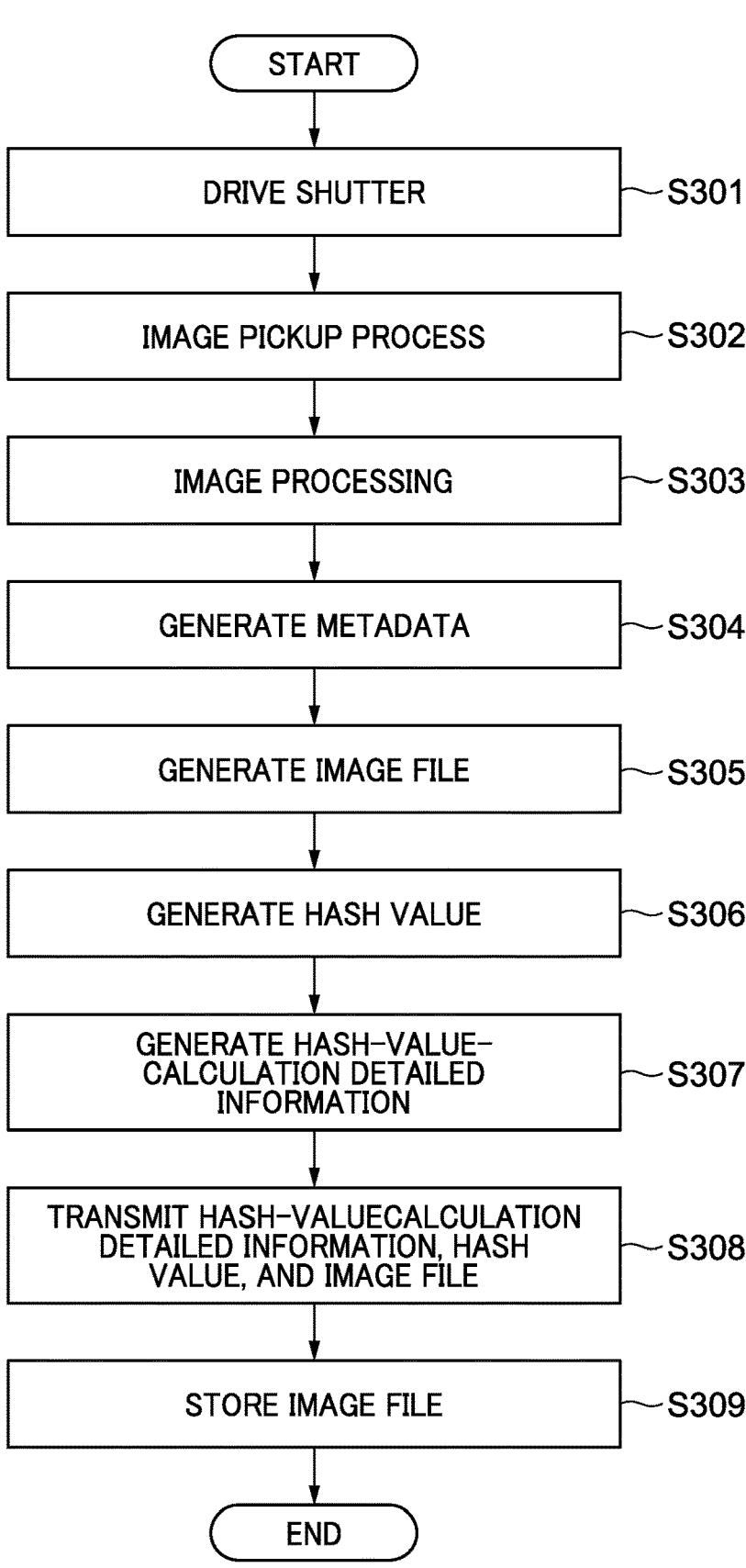
FIG. 3 is a flowchart illustrating the steps of a data transmission process executed in the image pickup apparatus in FIG. 1.

FIG. 3 is a flowchart illustrating the steps of a data transmission process executed in the image pickup apparatus 102 in FIG. 1. The data transmission process in FIG. 3 is implemented by the MPU 201 of the image pickup apparatus 102 executing a program stored in the storage medium 209 or the like. The data transmission process in FIG. 3 is started when the image pickup apparatus 102 receives an image-capturing start operation such as pressing a shooting button of the image pickup apparatus 102 by a photographer.

In FIG. 3, the MPU 201 drives a shutter (which is not illustrated) arranged on the subject side of the image pickup element 203 in order to control the exposure time (step S301).

Next, the MPU 201 performs an image pickup process in which the image pickup element 203 converts light from a subject, passing through the open shutter, into an electrical signal (analog image data) (step S302).

Next, the MPU 201 performs image processing such as development and encoding on the electrical signal obtained by the image pickup process (step S303). As a result, image data is generated.

Next, the MPU 201 generates metadata including attribute information (a person who captured image data, time of image capturing, location of image capturing, model of the image pickup apparatus, setting values at the time of image capturing, and the like) at the time the image pickup process was executed for generating the image data (step S304). As described above, the metadata may further include, as right holder information of the image data, information indicating a person who has acquired the right to own the image data from the person who captured the image data.

Next, the MPU 201 generates an image file in a JPEG format, an MPEG format, or the like in which the metadata is attached to the image data (step S305).

Next, the MPU 201 controls the hash value generation unit 210 to execute a hash function on binary data of the generated image file, thereby generating a hash value (step S306).

In generation (calculation) of the hash value, the hash value may be generated with parts of the binary data of the image file being skipped. In this case, the MPU 201 generates hash-value-calculation detailed information in which how the binary data of the image file was skipped (the way to thin out) (step S307).

Next, the MPU 201 controls the communication unit 211 to transmit the hash value and the image file to the management system 101 (step S308). At this time, hash-value-calculation detailed information is also transmitted to the management system 101, if the hash-value-calculation detailed information is generated in step S307. It should be noted that the data transmitted in step S308 may be subjected to encryption processing.

Next, the MPU 201 stores the image file in the storage medium 209 (step S309), and ends the present process.

In this manner, in the present embodiment, when the image pickup apparatus 102 performs an image pickup process (image capturing of a subject), not only the image file including the image data and the metadata is recorded in the storage medium 209, but also the image file and the hash value thereof are transmitted to the management system 101. Further, the hash-value-calculation detailed information is also transmitted to the management system 101, if the hash-value-calculation detailed information is generated in step S307.

Figure 4:
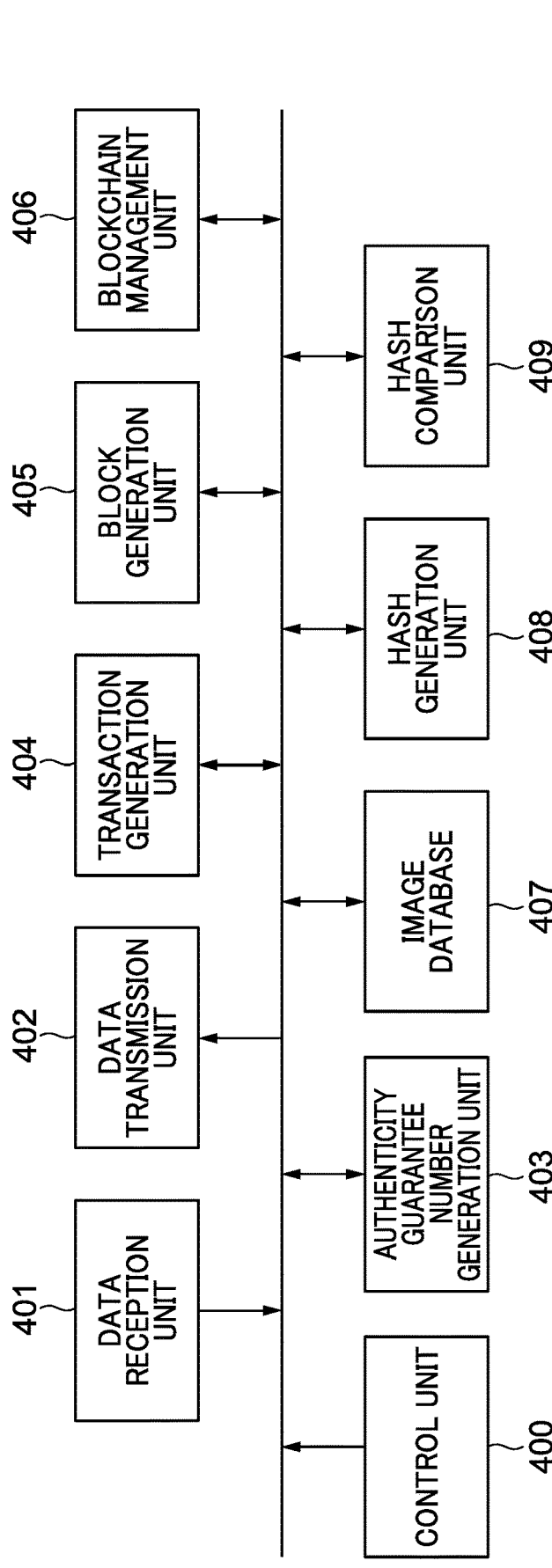
FIG. 4 is a block diagram schematically illustrating a configuration of a management system in FIG. 1.

FIG. 4 is a block diagram schematically illustrating a configuration of the management system 101 in FIG. 1. In the present embodiment, the management system 101 includes one or a plurality of computers connected to a network.

In FIG. 4, the management system 101 includes a control unit 400, a data reception unit 401, a data transmission unit 402, an authenticity guarantee number generation unit 403, and a transaction generation unit 404. Furthermore, the management system 101 includes a block generation unit 405, a blockchain management unit 406, the image database 407, a hash generation unit 408, and a hash comparison unit 409.

The control unit 400 is configured to control the entire management system 101.

The data reception unit 401 is configured to receive various data from an external device. For example, the data reception unit 401 is configured to receive a hash value, hash-value-calculation detailed information, and an image file from the image pickup apparatus 102. The data reception unit 401 is further configured to receive a request to purchase an image file selected from among a plurality of image files registered in the image database 407 from the communication device 105a operated by the purchaser of the image file. Further, the data reception unit 401 is configured to receive an image file, which is a target of authenticity determination, and an authenticity guarantee number for identifying the image file, from the communication device 105b operated by a viewer of the image publishing website 103.

The data transmission unit 402 is configured to transmit various data to an external device. For example, the data transmission unit 402 is configured to transmit an image file selected so as to be published on the image publishing website 103 and the authenticity guarantee number corresponding thereto to the image publishing website 103. The data transmission unit 402 is further configured to transmit an authenticity determination result to the communication device 105b operated by a viewer who made an authenticity confirmation request for an image file.

The authenticity guarantee number generation unit 403 is configured to, upon receiving a hash value and an image file from the image pickup apparatus 102, generate an authenticity guarantee number that is a unique number in the management system 101.

The transaction generation unit 404 is configured to generate transaction data and broadcast the generated transaction data to one or more computers (nodes) participating in the blockchain peer-to-peer network 104. The transaction data includes, for example, a hash value received from the image pickup apparatus 102, an authenticity guarantee number generated when the hash value is received and associated with the hash value, and metadata included in the image file.

The block generation unit 405 is configured to, when the broadcasted transaction data is approved by a miner and the verification thereof is completed, generate a block in which the transaction data is written, and connect the block to the blockchain.

The blockchain management unit 406 is configured to manage a blockchain also maintained by one or a plurality of computers (nodes) participating in the blockchain peer-to-peer network 104. The management system 101 and the nodes are synchronized with each other so that the blockchain maintained by each of them always has the same contents.

In the image database 407, image files and authenticity guarantee numbers corresponding to the respective image files are registered. Specifically, as illustrated in FIG. 5, the image database 407 includes items such as a block ID 501, an authenticity guarantee number 502, and an image file name 503, and pieces of data of the respective items are associated with each other.

The data stored in the image database 407 as the block ID 501 is a block ID (ID number) sequentially issued every time a block in which transaction data including information on an image file is written is connected to a blockchain. That is, each block ID stored as the block ID 501 corresponds to one of hash values registered in the blockchain.

The data stored in the image database 407 as the authenticity guarantee number 502 is an authenticity guarantee number corresponding to an image file.

The data stored in the image database 407 as the image file name 503 is a file name of an image file received by the management system 101 from the image pickup apparatus 102 or the like.

It should be noted that a configuration of the image database 407 is not limited to the above-described configuration, and the image database 407 may include other items.

Referring back to FIG. 4, the hash generation unit 408 is configured to, when the authenticity is determined, generate a hash value by executing a hash function on an image file transmitted from the communication device 105*b* of a user (viewer) who made an authenticity confirmation request.

The hash comparison unit 409 is configured to acquire a block (which will be described later) corresponding to the authenticity guarantee number transmitted from the user who made the authenticity confirmation request from the blockchain managed by the blockchain management unit 406. The hash comparison unit 409 is further configured to acquire a hash value (image hash value) written in the block in the blockchain. The hash comparison unit 409 is configured to compare the hash value acquired from the block with the hash value generated by the hash generation unit 408, thereby determining the authenticity. The hash comparison unit 409 is further configured to, in a case where these two hash values are the same, determine that the image file transmitted from the user who made the authenticity confirmation request is not falsified (is genuine) from the time of generation thereof. On the other hand, the hash comparison unit 409 is further configured to, in a case where the two hash values are different from each other, determine that the image file transmitted from the user who made the authenticity confirmation request is falsified (not genuine/false) from the time of generation thereof.

For example, there is a case where the image file acquired by the communication device 105*b* from the image publishing website 103 is falsified, and the falsified image file is transmitted to the management system 101 together with the authenticity confirmation request. In a case where there is such an authenticity confirmation request is made in this situation, the hash value generated by the hash generation unit 408 executing a hash function on the image file is different from the hash value generated from the image file before falsification. In the management system 101, the hash value stored in the blockchain is impossible to be changed by anyone. Therefore, in a case where the authenticity confirmation request is issued, the hash value generated for the image file by the hash generation unit 408 does not match the hash value stored in the block in the blockchain, corresponding to the authenticity guarantee number of the authenticity confirmation request.

Figure 6:
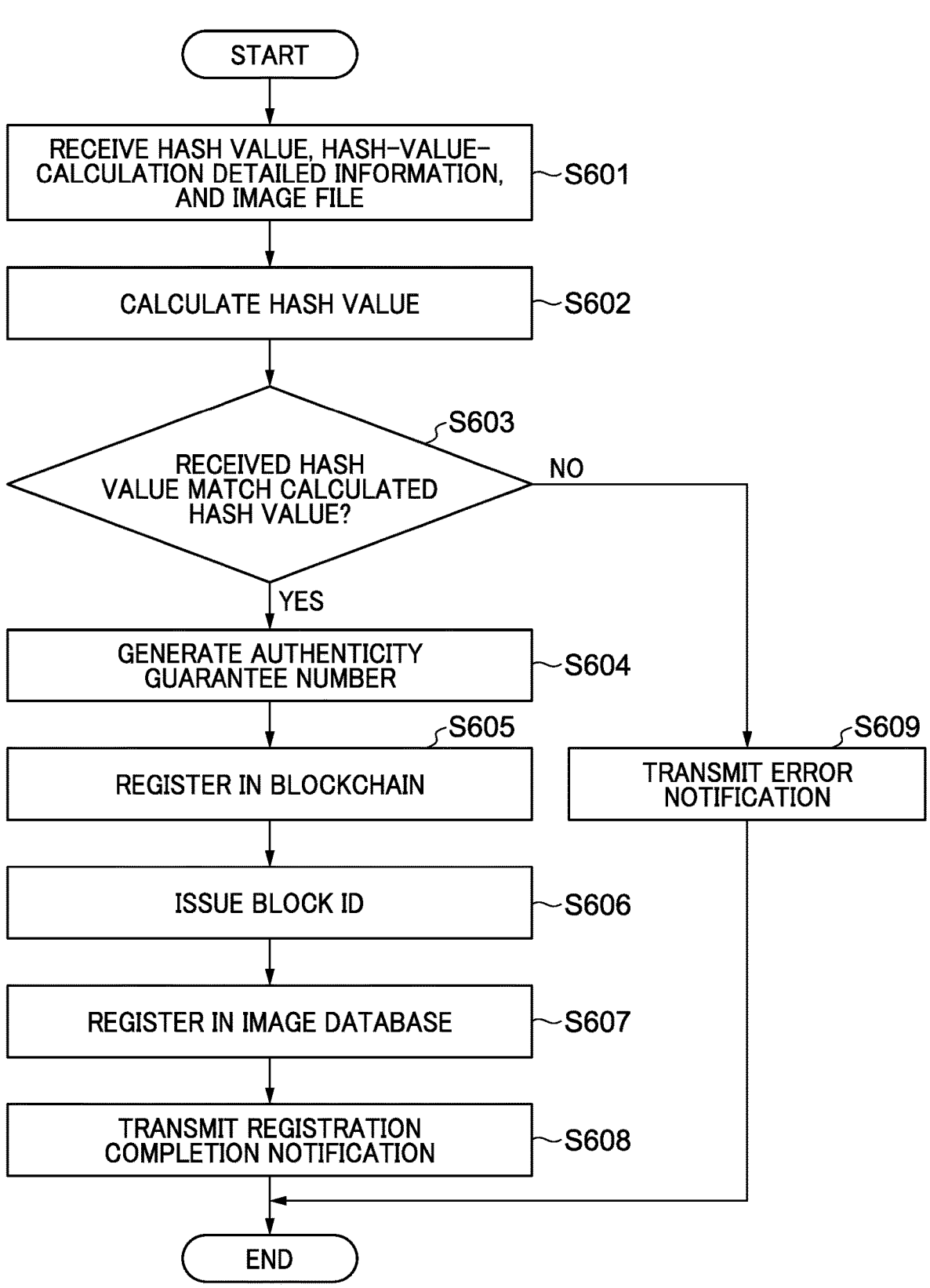
FIG. 6 is a flowchart illustrating the steps of a blockchain registration process executed in the management system in FIG. 1.

FIG. 6 is a flowchart illustrating the steps of a blockchain registration process executed in the management system 101 in FIG. 1. The blockchain registration process in FIG. 6 is implemented by the control unit 400 executing a program stored in a storage medium included in a computer constituting the management system 101. The blockchain registration process in FIG. 6 is executed, for example, when the data transmission process in FIG. 3 is performed by the image pickup apparatus 102 and the hash value and the image file are transmitted from the image pickup apparatus 102 through the process in step S308. Here, a description will be given as to a case where the hash-value-calculation detailed information is generated in step S307 and then the hash-value-calculation detailed information is transmitted to the management system 101 together with the hash value and the image file in step S308.

In FIG. 6, the control unit 400 receives a hash value, hash-value-calculation detailed information, and an image file from the image pickup apparatus 102 (step S601). In a case where encryption processing was performed on the received data, the control unit 400 performs decryption processing on the received data. Thereafter, the control unit 400 stores the hash value, the hash-value-calculation detailed information, and the metadata included in the received image file in a RAM (which is not illustrated).

Next, the control unit 400 applies a thinning process based on the hash-value-calculation detailed information to the image file received in step S601. The control unit 400 then calculates a hash value by executing a hash function on the image file after the thinning process (step S602). The control unit 400 determines whether or not the hash value received in step S601 matches the hash value calculated in step S602 (step S603).

As a result of the determination in step S603, in a case where these hash values match, the processing proceeds to step S604 that will be described later. As a result of the determination in step S603, in a case where these hash values do not match, the processing proceeds to step S609. In step S609, the control unit 400 transmits an error notification indicating that the hash value, the hash-value-calculation detailed information, and the metadata received from the image pickup apparatus 102 in step S601 cannot be registered in the blockchain. Thereafter, the present processing is ended.

In step S604, the control unit 400 controls the authenticity guarantee number generation unit 403 to generate an authenticity guarantee number of the received image file.

Next, the control unit 400 registers, in the blockchain, the authenticity guarantee number generated in step S604, and the hash value, the hash-value-calculation detailed information, and the metadata stored in the RAM in step S601 (step S605). Specifically, the control unit 400 controls the transaction generation unit 404 to generate transaction data including the authenticity guarantee number, the hash value, the hash-value-calculation detailed information, and the metadata. Next, the control unit 400 controls the transaction generation unit 404 to broadcast the transaction data to one or more computers (nodes) participating in the blockchain peer-to-peer network 104. When the broadcasted transaction data is approved by a miner and the verification thereof is completed, the block generation unit 405 generates a block in which the verified transaction data is written and connects (registers) the block to the blockchain.

Next, the control unit 400 issues a block ID corresponding to the block (step S606). Here, the control unit 400 issues a value generated by executing a hash function on the header of the block twice as the block ID. It should be noted that the block ID is used to refer to a block, but there is no field of the block ID in the block.

Next, the control unit 400 registers, in the image database 407, the issued block ID, the image file received in step S601, and the authenticity guarantee number generated in step S604 in association with each other (step S607). Next, the control unit 400 transmits, to the image pickup apparatus 102, a registration completion notification indicating that the process of registering the information on the image file in the blockchain has been completed (step S608). Thereafter, the blockchain registration process is ended.

Figure 7:
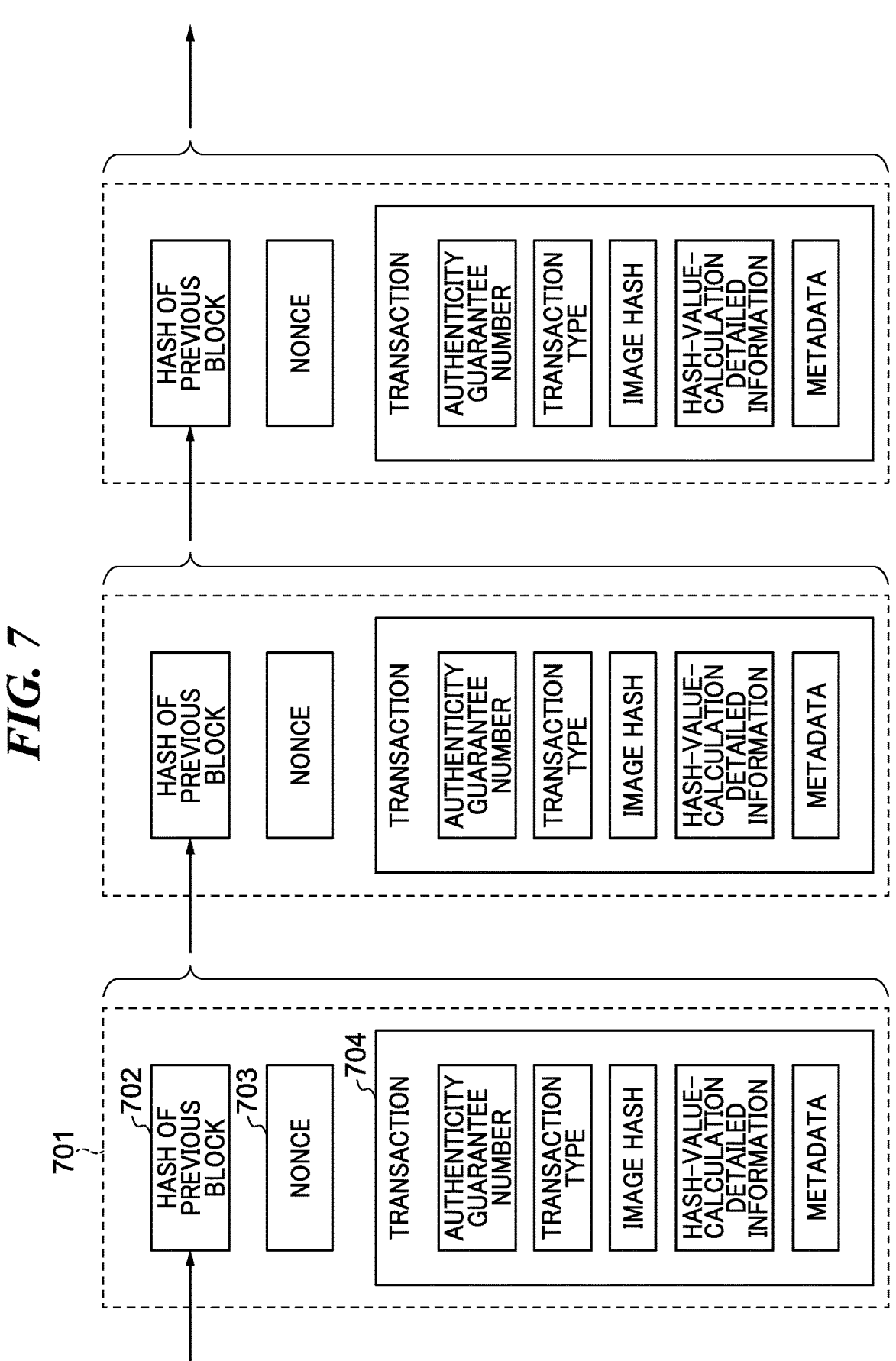
FIG. 7 is a diagram illustrating an example of a block data structure of a blockchain managed by a blockchain management unit in FIG. 4.

FIG. 7 is a diagram illustrating an example of a block data structure of the blockchain managed by the blockchain management unit 406 in FIG. 4. As illustrated in FIG. 7, a blockchain is a database formed by connecting blocks to each other in a time series like a chain. A block 701 connected to a blockchain includes a hash 702 of the previous block, a nonce 703, and a transaction 704.

The hash 702 of the previous block is a hash value of a block connected to the blockchain one block before the block 701.

The nonce 703 is a nonce value used for mining.

The transaction 704 is transaction data generated by the transaction generation unit 404, and includes a transaction type, an image hash, an authenticity guarantee number, hash-value-calculation detailed information, and metadata.

The transaction type is information indicating the type of transaction. An internal structure of a transaction varies depending on a transaction type.

The image hash is a hash value transmitted from the image pickup apparatus 102 to the management system 101.

The authenticity guarantee number is the authenticity guarantee number generated by the management system 101 when the image hash is transmitted from the image pickup apparatus 102 to the management system 101.

The hash-value-calculation detailed information is hash-value-calculation detailed information transmitted together with a hash value from the image pickup apparatus 102 to the management system 101.

The metadata is metadata included in an image file transmitted from the image pickup apparatus 102 to the management system 101.

Figure 8:
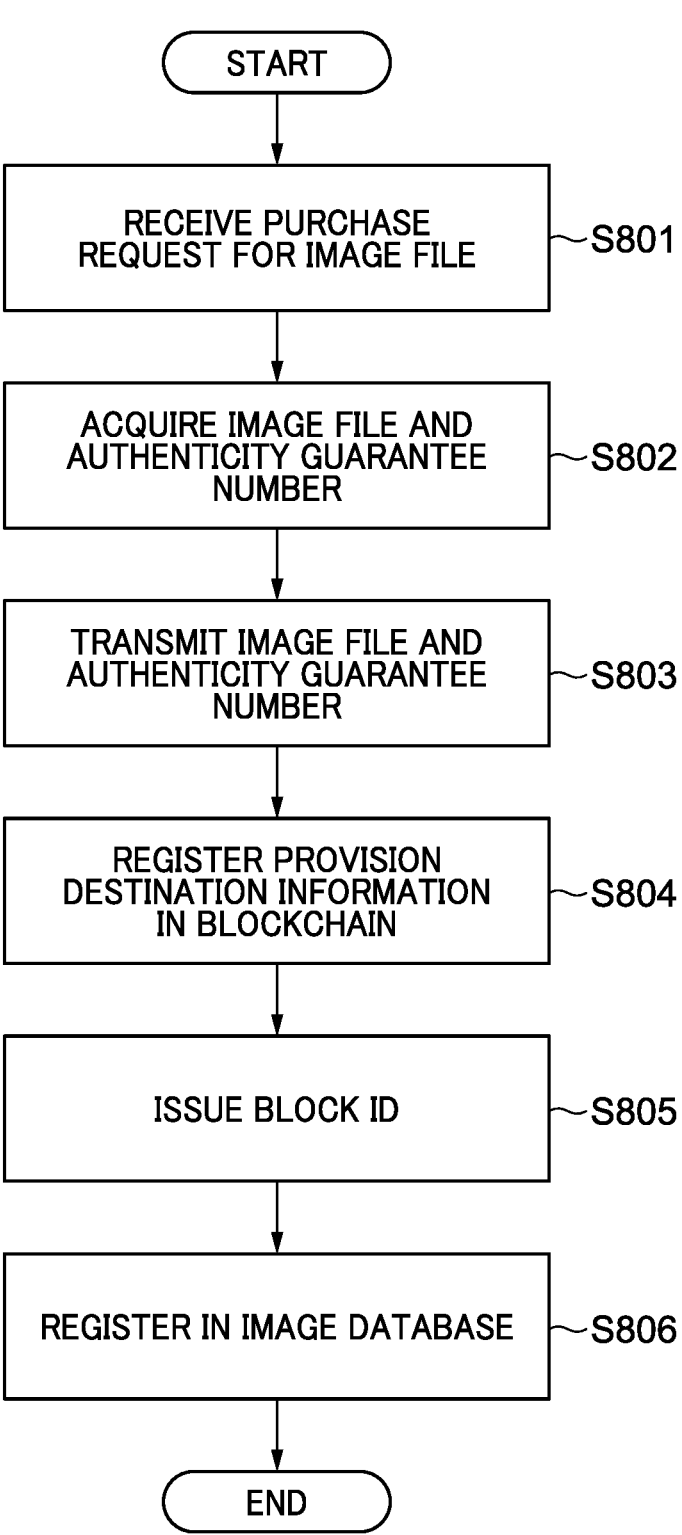
FIG. 8 is a flowchart illustrating the steps of a process of transmitting an image file to an image publishing website, executed by the management system in FIG. 1.

FIG. 8 is a flowchart illustrating the steps of a process of transmitting an image file to the image publishing website 103, executed by the management system 101 in FIG. 1. The image file transmission process in FIG. 8 is also performed by the control unit 400 executing a program stored in a storage medium included in the computer constituting the management system 101. The image file transmission process in FIG. 8 is executed, for example, when a user (for example, a purchaser of an image file) uses the communication device 105a to select an image file to be purchased from among a plurality of image files registered in the image database 407 and make a purchase request for the selected image file. The purchase request includes a block ID associated with the image file selected by the user in the image database 407. The purchase request further includes provision destination information. The provision destination information includes information indicating the user who has selected the image file, and address information of the web page of the image publishing website 103 on which an article created on the basis of the image file is posted.

In FIG. 8, the control unit 400 first causes the data reception unit 401 to receive the purchase request from the communication device 105a operated by the user (step S801).

Next, the control unit 400 acquires the image file that is a target of the purchase request and an authenticity guarantee number of the image file from the image database 407 (step S802). Specifically, the control unit 400 acquires, from the image database 407, the image file and the authenticity guarantee number, corresponding to the block ID included in the purchase request.

Next, the control unit 400 causes the data transmission unit 402 to transmit the acquired image file and authenticity guarantee number to the image publishing website 103 corresponding to provision destination information included in the purchase request (step S803). At the same time, the control unit 400 notifies the communication device 105a of the user, who is a request source of the purchase request, that the image file that is a target of the purchase request is now ready for publication on the image publishing website 103.

Next, the control unit 400 registers the provision destination information of the image file selected by the user in the block of the blockchain in association with the authenticity guarantee number of the image file (step S804). The provision destination information includes scheduled date and time information on which an article created on the basis of the image file is to be posted, in addition to the information indicating the user who has selected the image file described above and the address information of the web page of the image publishing website 103 on which the article created on the basis of the image file is posted. In step S804, specifically, the control unit 400 first controls the transaction generation unit 404 to generate, for example, transaction data including the provision destination information and the authenticity guarantee number of the image file selected by the user. Next, the control unit 400 controls the transaction generation unit 404 to broadcast the transaction data to one or more computers (nodes) participating in the blockchain peer-to-peer network 104. When the broadcasted transaction data is approved by a miner and the verification thereof is completed, the block generation unit 405 generates a block in which the verified transaction data is written and connects the block to the blockchain. As a result, the provision destination information of the image file selected by the user is registered in the block of the blockchain in association with the authenticity guarantee number of the image file.

Next, the control unit 400 issues a block ID corresponding to the block (step S805). Here, similarly to step S606 described above, the control unit 400 issues a value generated by executing a hash function on the header of the block twice as the block ID. It should be noted that the block ID is used to refer to a block, but there is no field of the block ID in the block.

Next, the control unit 400 registers the block ID issued in step S805 and the provision destination information registered in the blockchain in step S804 in the image database 407 in association with the authenticity guarantee number acquired in step S802 (step S806). For example, the control unit 400 adds new items for registering these pieces of information to the image database 407. In the image database 407, the control unit 400 registers the block ID issued in step S805 and the provision destination information registered in the blockchain in step S804 as data of the added new item and data of the row in which the authenticity guarantee number acquired in step S802 is set (that is, as the data associated with the authenticity guarantee number acquired in step S802). Thereafter, the image file transmission process is ended.

In the present embodiment, a description is given of the configuration in which the image file transmission process in FIG. 8 is executed in accordance with a purchase request from a purchaser different from a person who captured the image data, but a timing of executing the image file transmission process in FIG. 8 is not limited to the time when the purchase request is made. For example, when a right holder of an image file selects an image file that is a transmission target from among a plurality of image files registered in the image database 407 using the communication device 105*c* and makes a transmission request, the image file transmission process in FIG. 8 maybe executed. Similarly to the purchase request, the transmission request includes a block ID associated with the image file selected by the right holder in the image database 407 and provision destination information of the image file.

As described above, in the present embodiment, when an image file is transmitted from the management system 101 to the image publishing website 103, which is a provision destination of the image file, in response to the purchase request for the image file or the transmission request for the image file from a user, the provision destination information is registered in the blockchain in association with the authenticity guarantee number of the image file.

Figure 9:
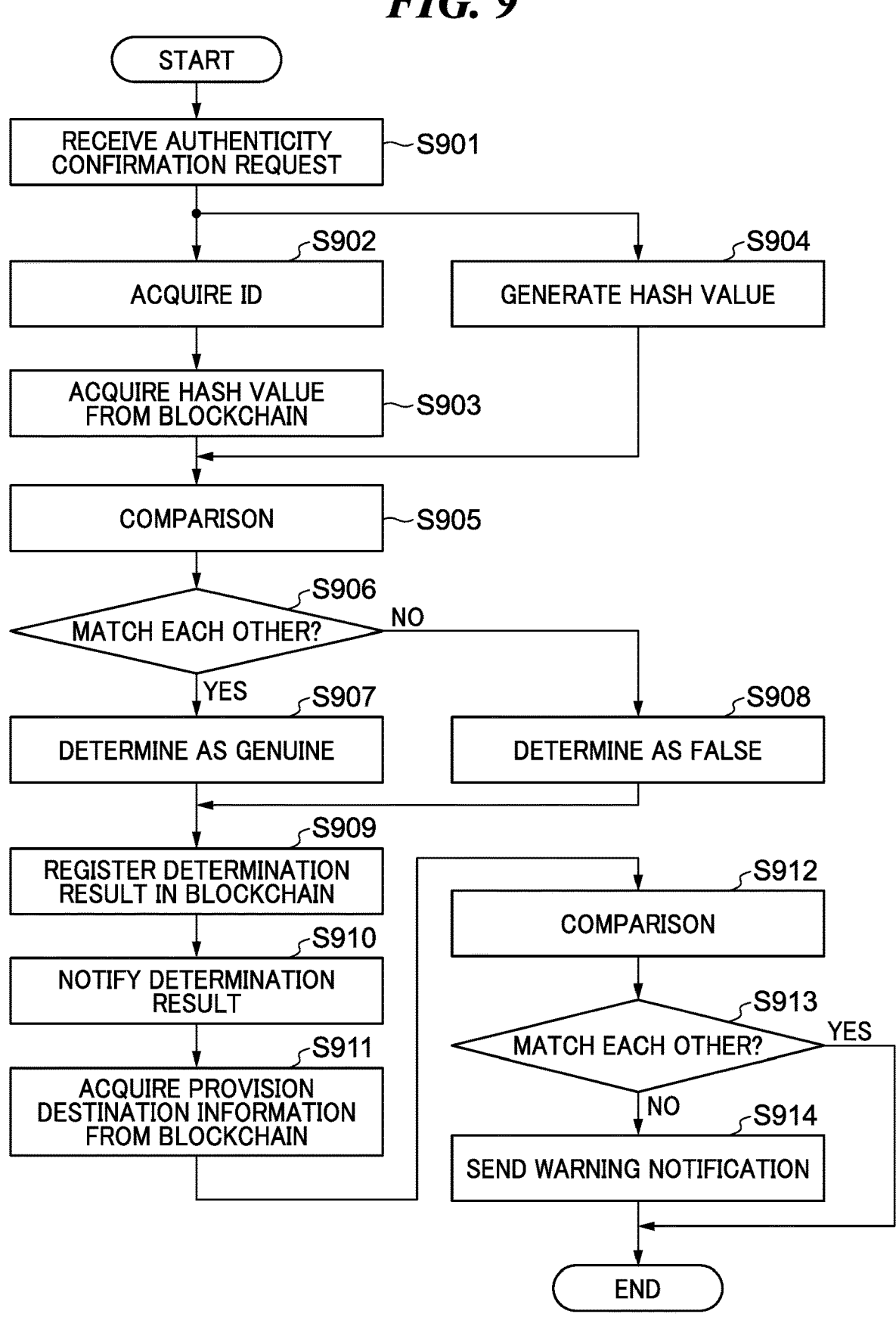
FIG. 9 is a flowchart illustrating the steps of an authenticity determination process executed in the management system in FIG. 1.

FIG. 9 is a flowchart illustrating the steps of an authenticity determination process executed in the management system 101 in FIG. 1. The authenticity determination process in FIG. 9 is also implemented by the control unit 400 executing a program stored in a storage medium included in the computer constituting the management system 101. Here, the authenticity determination process in FIG. 9 is executed when a viewer of the image publishing website 103 operates the communication device 105*b* to send, to the management system 101, an authenticity confirmation request for an image file published on the image publishing website 103, but is not limited thereto.

In FIG. 9, the control unit 400 causes the data reception unit 401 to receive the authenticity confirmation request from the communication device 105*b* operated by the viewer (step S901). At this time, the control unit 400 causes the data reception unit 401 to also receive the image file that is an authenticity determination target, an authenticity guarantee number corresponding to the image file, and user information of the image file. The user information includes, for example, address information of a posting destination of an article created on the basis of the image file and information indicating a creator of the article.

Next, the control unit 400 makes an inquiry to the image database 407 using the authenticity guarantee number received in step S901 as a key, and acquires a block ID corresponding to the authenticity guarantee number (step S902). In step S902, the control unit 400 acquires, for example, a block ID corresponding to the authenticity guarantee number and issued in step S606, that is, a block ID corresponding to the block including the image hash or the like. The control unit 400 also acquires a block ID corresponding to the authenticity guarantee number and issued in step S805 described above, that is, a block ID corresponding to the block including the provision destination information.

Next, the control unit 400 accesses a block in the blockchain corresponding to the acquired block ID, and acquires a hash value (image hash value) stored in the block (step S903).

In parallel with the processes in steps S902 and S903, the control unit 400 causes the hash generation unit 408 to execute a hash function on the image file received in step S901 (step S904). As a result, the control unit 400 causes the hash generation unit 408 to generate (acquire) a hash value. In this case, the control unit 400 accesses a block corresponding to the acquired block ID among the plurality of blocks constituting the blockchain, and acquires the hash-value-calculation detailed information stored in the block. In step S904, the control unit 400 generates the hash value by performing a thinning process on the image file while refers to the hash-value-calculation detailed information, and then executing a hash function on the image file subjected to the thinning process.

When the processes in steps S902 to S904 are completed, the control unit 400 causes the hash comparison unit 409 to compare the image hash value acquired in step S903 with the hash value generated in step S904 (step S905).

The control unit 400 determines whether or not the two hash values compared in step S905 match each other (step S906).

In a case where the two hash values each other as a result of the determination in step S906, the control unit 400 determines that the image file received in step S901 is "genuine" indicating that the image file has not been falsified since the generation thereof (step S907). Thereafter, the processing proceeds to step S909.

On the other hand, as a result of the determination in step S906, in a case where the two hash values do not match each other, the control unit 400 determines that the image file received in step S901 is "false" indicating that the image file has been falsified since generation thereof (step S908), and the processing proceeds to step S909.

Next, the control unit 400 controls the block generation unit 405 to register the determination result in step S907 or step S908 in the blockchain (step S909). Specifically, the block generation unit 405 generates a block in which the determination result in step S907 or S908 is written, and connects the block to the blockchain.

Next, the control unit 400 controls the data transmission unit 402 to notify the communication device 105*b*, which is the request sender of the authenticity confirmation request, of the determination result (step S910).

Next, the control unit 400 accesses the block in the blockchain, corresponding to the block ID acquired in step S902, and then acquires the provision destination information stored in the block (step S911). As a result, it is possible to acquire the provision destination information associated with the authenticity guarantee number received in step S901 among the information registered in the blockchain.

Next, the control unit 400 compares the provision destination information acquired in step S911 with the user information received in step S901 (step S912). Next, the control unit 400 determines whether or not the user of the image file that is a target of the authenticity confirmation request is a person who is permitted to use this image file. Specifically, the control unit 400 determines whether or not the address information included in the provision destination information acquired in step S911 matches or corresponds to the address information included in the user information received in step S901 (step S913).

As a result of the determination in step S913, in a case where the address information included in the provision destination information matches or corresponds to the address information included in the user information, the authenticity determination process is ended. As a result of the determination in step S913, in a case where the address information included in the provision destination information does not match or correspond to the address information included in the user information, the control unit 400 controls the data transmission unit 402 to send a warning notification to at least one of the right holder or the purchaser of the image file received in step S901 (step S914). This warning notification includes, for example, information indicating the result of the determination in step S913 and/or the address information of the web page received in step S901. The warning notification may further include a message indicating that there is concern that the image file may be used without permission. The control unit 400 can obtain a notification destination of the warning notification, for example, by referring to the provision destination information or the metadata associated with the authenticity guarantee number received in step S901 among the pieces of information registered in the blockchain. Thereafter, the authenticity determination process is ended.

In the present embodiment, a description is given of the configuration in which the control unit 400 determines whether or not the address information included in the provision destination information matches or corresponds to the address information included in the user information in step S913, but the process in step S913 is not limited to such determination. For example, the control unit 400 may determine whether or not the information indicating the user included in the provision destination information matches or corresponds to the information indicating the creator included in the user information.

As described above, according to the present embodiment, the following processes are executed in the management system 101. First, the management system 101 provides an image file selected by a user from among a plurality of image files that are management targets registered in the image database 407, to a provision destination of the image file. The management system 101 registers the provision destination information of the image file in a block of the blockchain in association with the authenticity guarantee number of the image file. The management system 101 receives an image file that is an authenticity determination target, the authenticity guarantee number of the image file, and user information of the image file, and then determines the authenticity of the received image file. In the determination of the authenticity of the received image file, the management system 101 compares the received user information with the provision destination information registered in the blockchain and associated with the received authenticity guarantee number. As a result, it is possible to determine whether the image file provided from the management system 101 is copied and used without permission.

In the embodiment described above, in a case where the address information included in the user information does not match or corresponds to the address information included in the provision destination information, a warning notification is sent to at least one of the right holder or the purchaser of the received image file. As a result, it is possible to notify the right holder and/or the purchaser of the received image file that there is concern that the image file may be used without permission.

The provision destination information may include address information of a posting destination of an article created on the basis of the selected image file. As a result, the management system 101 can determine whether the image file provided from the management system 101 is used in a web page, an SNS, or the like in which the image file is permitted to be used.

The provision destination information may include information indicating a user who has selected the image file. As a result, the management system 101 can determine whether the image file provided from the management system 101 is used by a person who is permitted to use the image file.

The user who has selected the image file may be a purchaser of the image file. In this case, on the basis of a request from the purchaser of the image file, the management system 101 can provide the image file to the provision destination of the image file, and can register provision destination information including information indicating the purchaser in the block of the blockchain in association with an authenticity guarantee number. As a result, the management system 101 can determine whether a user of the image file provided from the management system 101 is a purchaser of the image file.

A user who has selected the image file may be a right holder of the image file. In this case, the management system 101 can provide the image file to a provision destination of the image file on the basis of a request from the right holder of the image file, and register provision destination information including information indicating the right holder in the block of the blockchain in association with an authenticity guarantee number. As a result, it is possible to determine whether a user of the image file provided from the management system 101 is a right holder of the image file.

Although the present invention has been described using the above-described embodiments, the present invention is not limited to the above-described embodiments. For example, in step S913 described above, when it is determined that the address information (or the information indicating the creator) included in the user information does not match or corresponds to the address information (or the information indicating the user) included in the provision destination information, the management system 101 may register the user information in the blockchain as user information of an unknown user. As a result, it is possible to leave, as evidence, information regarding a user who has used the image file that is an authenticity determination target without permission.

In the present embodiment, only in a case where the provision destination information of the image file included in the purchase request received in step S801 is not registered in the blockchain, the management system 101 may register the provision destination information in the blockchain.

Figure 10:
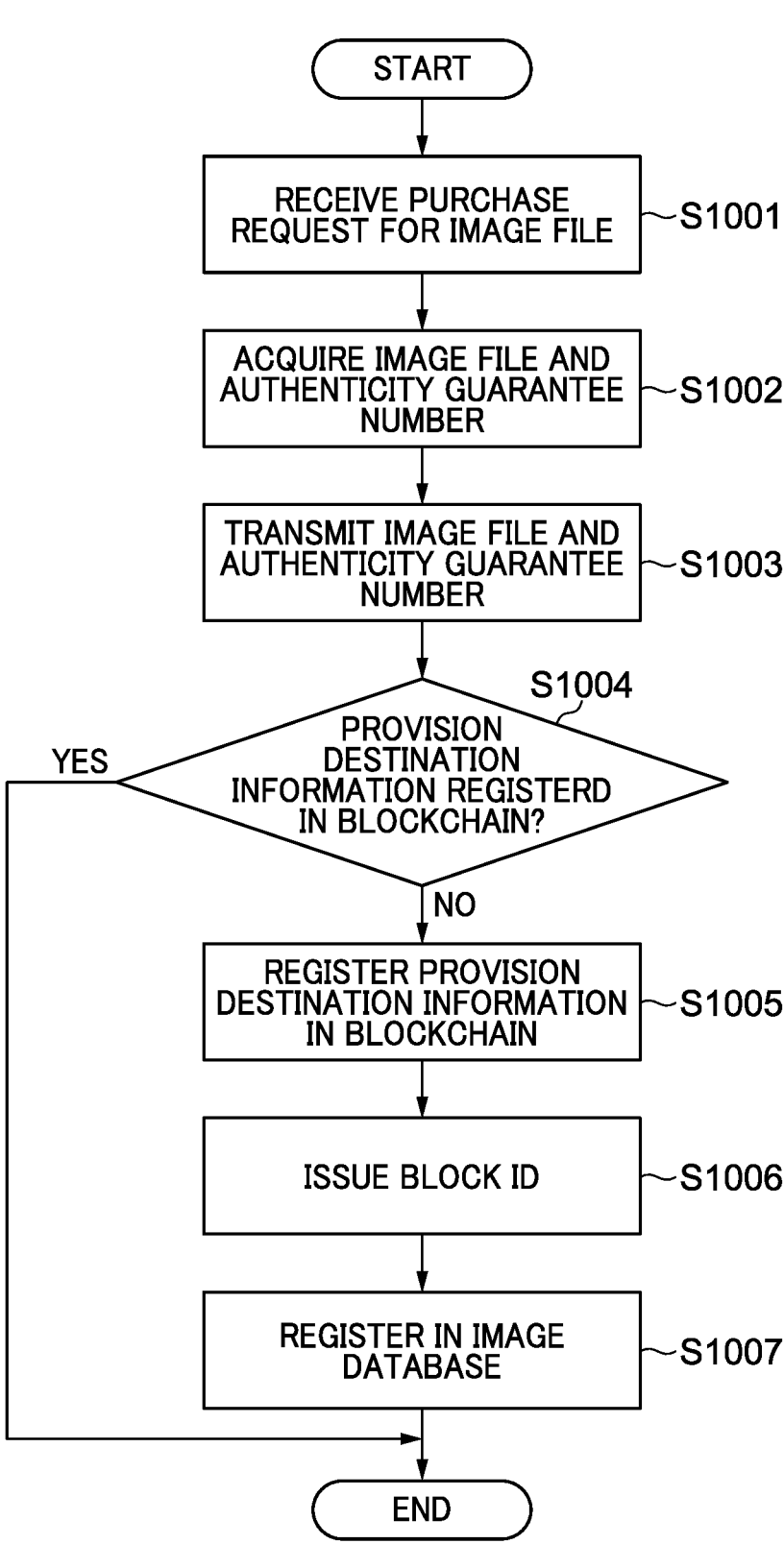
FIG. 10 is a flowchart illustrating another procedure of the image file transmission process in FIG. 8.

FIG. 10 is a flowchart illustrating another example of the steps of the image file transmission process in FIG. 8. Similarly to the image file transmission process in FIG. 8, the image file transmission process in FIG. 10 is also performed by the control unit 400 executing a program stored in a storage medium included in a computer configuring the management system 101. Similarly to the image file transmission process in FIG. 8, the image file transmission process in FIG. 10 is also executed, for example, when the purchaser uses the communication device 105*a* to select an image file that is a purchase target from among a plurality of image files registered in the image database 407 and make a purchase request for the selected image file. Alternatively, the image file transmission process is executed when the right holder uses the communication device 105*c* to select an image file that is a transmission target from among a plurality of image files registered in the image database 407 and make a transmission request for the selected image file.

In FIG. 10, the control unit 400 first performs processes in steps S1001 to S1003, which are processes similar to those in steps S801 to S803 described above. Next, the control unit 400 determines whether or not the provision destination information included in the purchase request has been registered in the blockchain (step S1004). In step S1004, for example, the control unit 400 makes an inquiry to the image database 407 using the authenticity guarantee number acquired in step S1002 as a key. In a case where a block ID corresponding to the authenticity guarantee number and corresponding to the provision destination information is not available, the control unit 400 determines that the provision destination information included in the purchase request is unregistered in the blockchain. In a case where the block ID corresponding to the authenticity guarantee number and corresponding to the provision destination information is available, the control unit 400 accesses a block corresponding to the acquired block ID in the blockchain and acquires provision destination information stored in the block. In a case where the acquired provision destination information does not match or corresponds to the provision destination information included in the purchase request, the control unit 400 determines that the provision destination information included in the purchase request is unregistered in the blockchain.

On the other hand, in a case where the acquired provision destination information matches or corresponds to the provision destination information included in the purchase request, the control unit 400 determines that the provision destination information included in the purchase request has been registered in the blockchain.

As a result of the determination in step S1004, in a case where the provision destination information included in the purchase request has been registered in the blockchain, the image file transmission process is ended. As a result of the determination in step S1004, in a case where the provision destination information included in the purchase request is unregistered in the blockchain, the control unit 400 performs the processes in steps S1005 to S1007, which are processes similar to those in steps S804 to S806 described above.

In the above-described embodiment, only in a case where it is determined that the provision destination information is unregistered in the block of the blockchain, the control unit 400 registers the provision destination information in the block of the blockchain in association with the authenticity guarantee number of the selected image file. As a result, it is possible to prevent a plurality of pieces of the same provision destination information from being registered in the blockchain.

It should be noted that, in the present embodiment, in step S1005, the control unit 400 may register, in the blockchain, added provision destination information 1103 obtained by adding provision destination information 1102 included in the purchase request to provision destination information 1101 in FIG. 11 acquired from the block of the blockchain. In such a configuration, the control unit 400 may delete the provision destination information 1101 and a block ID thereof from the image database 407, for example. As a result, in a case where an image file is provided to a plurality of provision destinations, it is possible to manage the image file with one piece of provision destination information, and it is possible to simplify the management of the provision destination information.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2023-004478 filed on Jan. 16, 2023 which is hereby incorporated by reference herein in its entirety.

What is claimed is:

1. A management system that manages content data corresponding to a hash value registered in a block of a blockchain, the management system comprising:
   a memory storing instructions; and
   at least one processor that executes the instructions to:
   provide content data selected by a user from among a plurality of pieces of content data that are management targets, to a provision destination of the selected content data;
   confirm completion of providing the selected content data to the provision destination;

generate transaction data on confirming the completion of providing the selected content data;

register, via the generated transaction data, information on the provision destination of the selected content data in a block of the blockchain in association with an identification number for identifying the selected content data, wherein the information on the provision destination at least includes address information of a web page or social network posting in which the selected content data is embedded or posted;

receive content data that is a target of authenticity determination, an identification number for identifying the content data that is the target of authenticity determination, and user information of the content data that is the target of authenticity determination;

determine authenticity of the received content data;

in a determination of the authenticity of the received content data, determine whether or not a character string of the received user information matches a character string of the information on the provision destination registered in the blockchain and associated with the received identification number;

in a case where it is determined that the character string of the received user information matches the character string of the information on the provision destination, determine that the received content data is authentic; and in a case where it is determined that the character string of the received user information does not match the character string of the information on the provision destination, send a warning notification to at least one of a right holder of the received content data or a purchaser of the received content data, and register user information of an unknown user indicating an occurrence of a mismatch between the character string of the received user information and the character string of the information on the provision destination, via additional transaction data into the blockchain.

2. The management system according to claim 1, wherein the at least one processor executes the instructions to determine whether or not the information of the provision destination of the selected content data has been registered in a block of the blockchain, and only in a case where it is determined that the information on the provision destination of the selected content data is unregistered in a block of the blockchain, register the information of the provision destination in a block of the blockchain in association with the identification number for identifying the selected content data.

3. The management system according to claim 1, wherein the information on the provision destination includes address information of a posting destination of an article created on the basis of the selected content data.

4. The management system according to claim 1, wherein the information on the provision destination includes information indicating the user.

5. The management system according to claim 1, wherein the user is a purchaser of the selected content data.

6. The management system according to claim 1, wherein the user is a right holder of the selected content data.

7. The management system according to claim 1, wherein the at least one processor executes the instructions to provide content data including image data to the provision destination as the selected content data, the image data being generated by capturing an image of a subject with an image pickup apparatus.

8. A content management method for managing content data corresponding to a hash value registered in a block of a blockchain, the content management method comprising:

providing content data selected by a user from among a plurality of pieces of content data that are management targets, to a provision destination of the selected content data;

confirming completion of providing the selected content data to the provision destination;

generating transaction data on confirming the completion of providing the selected content data;

registering, via the generated transaction data, information on the provision destination of the selected content data in a block of the blockchain in association with an identification number for identifying the selected content data, wherein the information on the provision destination at least includes address information of a web page or social network posting in which the selected content data is embedded or posted;

receiving content data that is a target of authenticity determination, an identification number for identifying the content data that is the target of authenticity determination, and user information of the content data that is the target of authenticity determination;

determining authenticity of the received content data;

in the determining, determining whether or not a character string of the received user information matches a character string of the information on the provision destination registered in the blockchain and associated with the received identification number;

in a case where it is determined that the character string of the received user information matches the character string of the information on the provision destination, determining that the received content data is authentic; and in a case where it is determined that the character string of the received user information does not match the character string of the information on the provision destination, sending a warning notification to at least one of a right holder of the received content data or a purchaser of the received content data, and registering user information of an unknown user indicating an occurrence of a mismatch between the character string of the received user information and the character string of the information on the provision destination, via additional transaction data into the blockchain.

9. The management method according to claim 8, further comprising:

determining whether or not the information on the provision destination of the selected content data has been registered in a block of the blockchain; and only in a case where it is determined that the information on the provision destination of the selected content data is unregistered in a block of the blockchain, registering the information on the provision destination in a block of the blockchain in association with an identification number for identifying the selected content data.

10. The management method according to claim 8, wherein the information on the provision destination includes address information of a posting destination of an article created on the basis of the selected content data.

11. The management method according to claim 8, wherein the information on the provision destination includes information indicating the user.

12. The management method according to claim 8, wherein the user is a purchaser of the selected content data.

13. The management method according to claim 8, wherein the user is a right holder of the selected content data.

14. The management method according to claim 8, wherein content data including image data generated by capturing an image of a subject with an image pickup apparatus is provided to the provision destination as the selected content data.

15. A non-transitory computer-readable storage medium storing a program for causing a computer to execute a content management method for managing content data corresponding to a hash value registered in a block of a blockchain, the content management method comprising:

providing content data selected by a user from among a plurality of pieces of content data that are management targets, to a provision destination of the selected content data;

confirming completion of providing the selected content data to the provision destination;

generating transaction data on confirming the completion of providing the selected content data;

registering, via the generated transaction data, information on the provision destination of the selected content data in a block of the blockchain in association with an identification number for identifying the selected content data, wherein the information on the provision destination at least includes address information of a web page or social network posting in which the selected content data is embedded or posted;

receiving content data that is a target of authenticity determination, an identification number for identifying the content data that is the target of authenticity determination, and user information of the content data that is the target of authenticity determination;

determining authenticity of the received content data;

in the determining, determining whether or not a character string of the received user information matches a character string of the information on the provision destination registered in the blockchain and associated with the received identification number;

in a case where it is determined that the character string of the received user information matches the character string of the information on the provision destination, determining that the received content data is authentic; and in a case where it is determined that the character string of the received user information does not match the character string of the information on the provision destination, sending a warning notification to at least one of a right holder of the received content data or a purchaser of the received content data, and registering user information of an unknown user indicating an occurrence of a mismatch between the character string of the received user information and the character string of the information on the provision destination, via additional transaction data into the blockchain.

\* \* \* \* \*